Nov. 3, 1964   J. F. GIST   3,155,287
MEANS FOR HANDLING FINELY DIVIDED MATERIAL
Filed Sept. 19, 1962   2 Sheets-Sheet 1
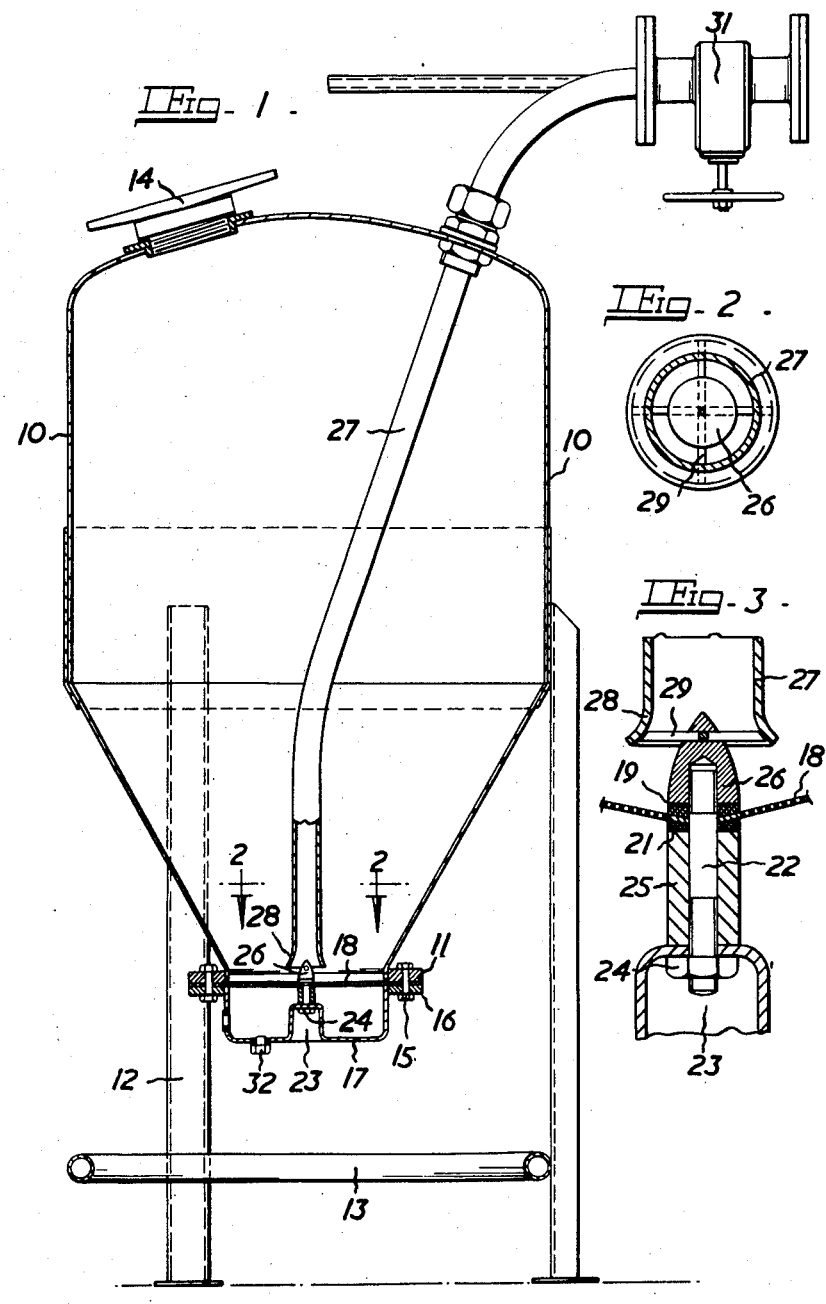

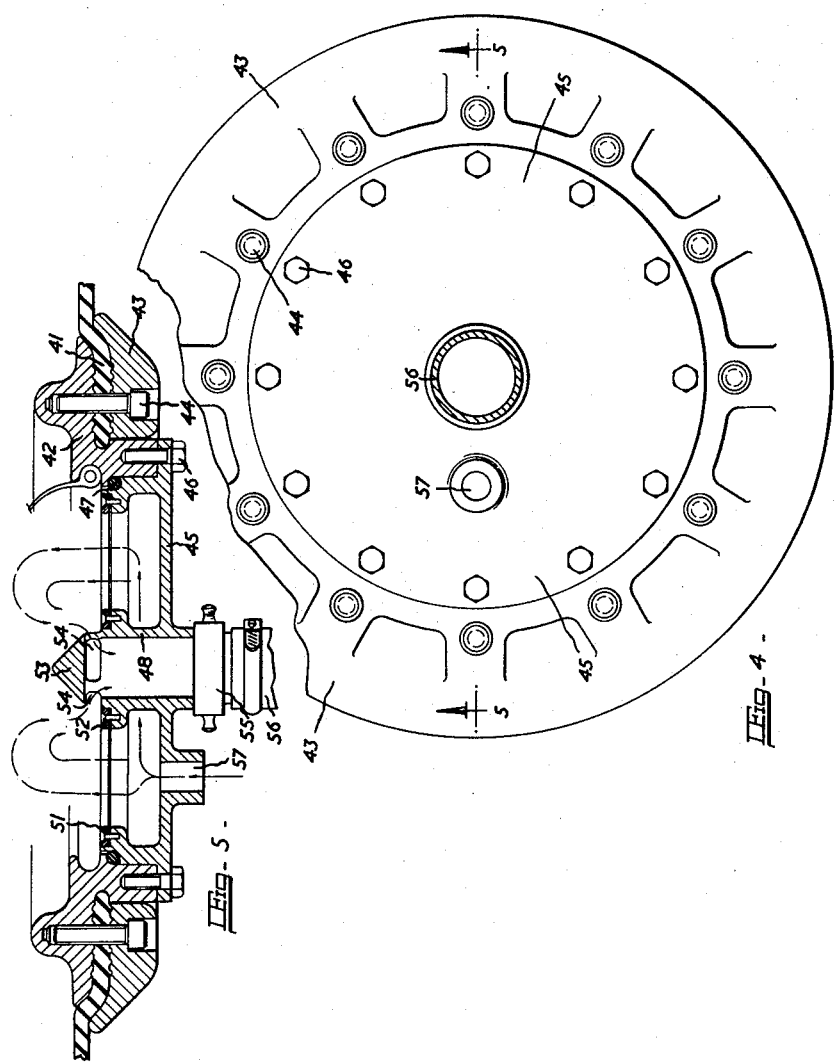

3,155,287
MEANS FOR HANDLING FINELY DIVIDED
MATERIAL
John Frederick Gist, Barnt Green, England, assignor to
G. & A. Firkins Limited, a British company
Filed Sept. 19, 1962, Ser. No. 224,793
8 Claims. (Cl. 222—189)

This invention relates to new or improved means for handling finely divided material.

The term handling is intended to include the movement of material from one point to another and the discharge of material from a container with or without its delivery into another container or into a vehicle or other means of transport.

According to our invention, finely divided material is fed into or stored in a closed vessel having at or adjacent to its lower end a screen of very fine mesh separating the vessel from a chamber connected to a source of air under pressure and having a centrally disposed discharge pipe of which the open lower end is located a short distance above the screen and which is provided with a delivery valve outside the vessel.

To discharge the material from the vessel air under pressure is supplied to the chamber below the screen and is forced upwardly in a state of very fine division into and through the material until the material is fluidised, each particle of the material being separated from adjacent particles by a thin film or coating of air.

When the material is completely fluidised the pressure in the vessel above the material has risen to a value substantially equal to that of the air supply, the pressure being indicated by a gauge connected to the upper end of the vessel.

The delivery valve is then opened and air flows outwardly through the discharge pipe taking with it the material in suspension and in a completely discrete state. The air above the material maintains a downward pressure on the material forcing it downwardly towards the mouth of the discharge pipe, and the discharge of the material from the vessel is effected very rapidly and completely.

Tests with an experimental vessel have shown that ten tons of material can be discharged in three minutes. The amount of air consumed is very low so that the process is economical to operate.

Further, there is no appreciable tendency for the particles of material to cohere in the discharge pipe and cause stoppages.

In a modification the material instead of being discharged from the vessel through a pipe having an opening above the screen and leading out of the upper end of the vessel may be discharged in a downward direction through an outlet passing through the screen and air chamber and controlled by an external valve.

Two practical embodiments of our invention are illustrated by way of example in the accompanying drawings in which:

FIGURE 1 is a vertical section of a vessel discharging through a pipe passing through the upper end of the vessel.

FIGURE 2 a fragmentary horizontal section of the outlet pipe on the line 2—2 of FIGURE 1.

FIGURE 3 is a vertical section on a larger scale of the lower end of the outlet pipe and the adjacent parts.

FIGURE 4 is a plan of the base of a vessel from which material is discharged in a downward direction.

FIGURE 5 is a vertical section of the base on the line 5—5 of FIGURE 4.

In the form shown in FIGURES 1 to 3 a vessel 10 adapted to contain finely divided material is cylindrical over its upper part and tapers downwardly over its lower part to a central bottom opening of relatively small diameter to which is welded an annular flange 11. If the vessel is stationary it may be supported by legs 12 welded at their upper ends to the wall of the vessel and connected by a ring 13. An opening of substantial size for the introduction of finely divided material is provided in the upper end of the vessel, the opening having a removable screwed or other airtight closure 14.

Secured to the flange 11 by bolts 15 there is a complementary flange 16 on a shallow air chamber 17 which fits over the opening in the bottom of the vessel, and the peripheral edge of a screen 18 is clamped between the flanges 11 and 16 with annular rubber washers interposed between the screen and the flanges.

The central portion of the screen is clamped between two chamfered discs 19, 21 on a bolt 22 which extends downwardly through the bottom wall of the chamber into a recess 23 in the wall. A nut 24 is screwed on to the bottom end of the bolt and a spacing sleeve 25 is located on the bolt between the screen and the bottom wall of the chamber, the sleeve being of such an axial length that when the nut is tightened the centre of the screen is pulled down as shown in FIGURE 3 to give the screen a shallow dished form and keep it taut.

The upper end of the bolt 22 is screwed into a tapered nose 26 which projects upwardly into the lower end of a discharge tube 27 which terminates in a bell mouth 28. The nose may carry a spider 29 which engages with the lower end of the tube to maintain it accurately concentric with the nose, or the nose may be integral with or may be rigidly secured to a bell mouth into which the lower end of the tube is secured.

By changing the sleeve 25 on the bolt the vertical spacing between the screen and the open lower end of the discharge tube can be varied for dealing with different material. This adjustment can also be provided in various other ways.

The discharge tube 27 is carried upwardly through the upper end of the vessel, and outside the vessel it is provided with a contol valve 31 of any convenient type providing when open a bore of the full diameter of the tube.

Means may be provided for blowing air into the tube adjacent to the valve for clearing the tube of material in the event of failure of the supply to the pressure chamber before discharge of material from the vessel is complete.

Air under pressure for fluidising the material and discharging it from the vessel is fed into the air chamber 17 through a connection 32 and is forced up into the vessel through the screen 18.

It is essential that the interstices in the screen for the passage of air should be extremely small and that the screen should be sufficiently strong mechanically to support the weight of the material in the vessel. One suitable form of screen is made from powdered stainless steel sintered together under heat and pressure. Another suitable form of screen is made from two or more layers of woven stainless steel mesh which are superimposed and sintered together under heat and pressure.

The size of the interstices in the screen will be selected according to the material to be dealt with and may be between ½ micron and 150 microns. As the screen is substantially rigid and highly resistant to wear the size of the interstices remain constant.

If foreign bodies of appreciable weight may find their way into the vessel the screen may be protected by mounting it between two sheets of perforated metal which are spaced from the screen so that they do not impede the flow of air through the screen.

In the modified arrangement shown in FIGURES 4 and 5 the material is discharged from the container through a bottom outlet passing through the screen and air chamber.

In this arrangement a container made of any suitable flexible plastic material has at its lower end an inturned lip or flange 41 which is clamped against an annular surface on a ring 42 by a clamping ring 43 secured to the ring 42 by bolts 44. A circular air chamber 45 is secured by bolts 46 to the underside of the ring 42, the joint being sealed by a rubber ring 47. In the centre of the air chamber there is an integral boss 48 which forms the outlet for the material. The screen 49 has a central opening to fit over the boss and the inner and outer edges of the screen are secured to flat annular seating surfaces on the periphery of the air chamber and around the boss by clamping rings 51 and 52.

The hollow boss 48 terminates at its upper end in a coned cap 53 below which are radial ports 53 for the entry of fluidised material, the ports being immediately above the level of the screen. The lower end of the boss receives a quick release coupling 55 for the attachment of a pipe 56 through which the material is delivered and which incorporates a control valve.

An inlet 57 for the introduction of air under pressure into the air chamber is provided in the bottom of the chamber.

In each of the constructions illustrated the discharge pipe may be arranged to convey the material from the container to any other point at the same or at a different level or to deliver it into storage containers or into road or rail vehicles for transport.

The term finely divided material used herein is intended to include any materials from the finest powders to granular material.

I claim:

1. Means for handling finely divided material comprising: a closed container, having an opening in its upper part; a removable closure for said opening for the introduction of material; means defining an opening in the lower end of said container; a fine mesh screen extending ove said opening; an air chamber separated from said container by said screen and adapted to be connected to a source of air under pressure; a discharge pipe leading out of said container from a point adjacent to the upper surface of said screen; and a control valve in said discharge pipe outside said container.

2. Means for handling finely divided material comprising: a closed container; means defining an opening in the upper part of said container; a removable airtight closure for said opening for the introduction of material; means defining an opening in the bottom of said container; an air chamber closing said last-mentioned opening and adapted to be connected to a source of air under pressure; a fine mesh screen separating said air chamber from said container; a discharge pipe passing through and extending downwardly from the upper part of said container and terminating in a bell mouth located adjacent to the upper surface of said screen; and a valve in said discharge pipe outside said container.

3. Means for handling finely divided material as in claim 2 wherein a member extending through said screen carries a coned head entering axially into the bell mouth of the discharge pipe.

4. Means for handling finely divided material as in claim 2 including means for adjusting the spacing between said screen and said bell mouth on the discharge pipe.

5. Means for handling finely divided material comprising: a flexible plastic container; means defining an opening in the lower end of said container; an assembly mounted in an airtight manner in said opening and incorporating an air chamber adapted to be connected to a source of air under pressure; a fine mesh screen separating said air chamber from said container; a hollow boss which extends through said air chamber and screen into said container, and is adapted at its lower end to receive a discharge pipe, said boss terminating at its upper and in a coned head and means defining radial ports below said coned head for the entry of material into said boss.

6. Means for handling finely divided material comprising:
   a closed container, having an opening in its upper part provided with a removable closure for the introduction of material;
   an opening in the lower end of the container;
   a fine mesh screen extending thereover, said screen comprising a plurality of superimposed layers of woven stainless steel cloth sintered together and rolled to produce a screen of controlled porosity;
   an air chamber separated from said container by said screen and adapted to be connected to a source of air under pressure;
   a discharge pipe leading out of said container from a point adjacent to the upper surface of the screen;
   and a control valve in said discharge pipe outside the container.

7. Means for handling finely divided material comprising:
   a closed container;
   means defining an opening in the upper part of the container;
   a removable airtight closure for said opening for the introduction of material;
   means defining an opening in the bottom of the container;
   an air chamber closing said last-mentioned opening, and adapted to be connected to a source of air under pressure;
   a fine mesh screen separating said air chamber from said container, said screen comprising a plurality of superimposed layers of woven stainless steel cloth sintered together and rolled to produce a screen of controlled porosity;
   a discharge pipe passing through and extending downwardly from the upper part of said container and terminating in a bell mouth located adjacent to the upper surface of said screen;
   and a valve in the discharge pipe outside said container.

8. Means for handling finely divided material comprising:
   a flexible plastic container;
   means defining an opening in the lower end of said container;
   an assembly mounted in an airtight manner in said opening and including an air chamber adapted to be connected to a source of air under pressure;
   a fine mesh screen separating said air chamber from said container, said screen comprising a plurality of superimposed layers of woven stainless steel cloth sintered together and rolled to produce a screen of controlled porosity;
   and a hollow boss which extends through said air chamber and screen into said container and adapted at its lower end to receive a discharge pipe, said boss terminating at its upper end in a coned head below which are radial ports for the entry of material into said boss.

References Cited in the file of this patent

UNITED STATES PATENTS

| | | |
|---|---|---|
| 1,347,358 | Adams | July 20, 1920 |
| 1,898,354 | Fichey | Feb. 21, 1933 |
| 2,812,883 | Hayford | Nov. 12, 1957 |